United States Patent
Masson et al.

(10) Patent No.: US 9,387,623 B2
(45) Date of Patent: Jul. 12, 2016

(54) METHOD FOR MANUFACTURING A STRUCTURAL PART MADE OF A COMPOSITE MATERIAL AND INCLUDING A RADIALLY ORIENTED DOUBLE YOKE

(75) Inventors: Richard Masson, Velizy-Villacoublay (FR); Thierry Rougier, Velizy-Villacoublay (FR); Patrick Dunleavy, Velizy-Villacoublay (FR)

(73) Assignee: MESSIER-BURGATTI-DOWTY, Velizy Villacoublay (FR)

( * ) Notice: Subject to any disclaimer, the term of this patent is extended or adjusted under 35 U.S.C. 154(b) by 349 days.

(21) Appl. No.: 14/236,688

(22) PCT Filed: Aug. 6, 2012

(86) PCT No.: PCT/EP2012/065370
§ 371 (c)(1),
(2), (4) Date: Apr. 23, 2014

(87) PCT Pub. No.: WO2013/020955
PCT Pub. Date: Feb. 14, 2013

(65) Prior Publication Data
US 2014/0283974 A1    Sep. 25, 2014

(30) Foreign Application Priority Data
Aug. 9, 2011   (FR) ...................................... 11 57251

(51) Int. Cl.
*B29C 70/68*   (2006.01)
*B29C 65/72*   (2006.01)
(Continued)

(52) U.S. Cl.
CPC ............... *B29C 65/72* (2013.01); *B29C 70/222* (2013.01); *B29C 70/24* (2013.01); *B29C 70/543* (2013.01);
(Continued)

(58) Field of Classification Search
CPC ...... B29C 65/72; B29C 70/48; B29C 70/543; B29C 70/865; B29C 70/222; B29C 70/24
USPC .................... 156/148, 305, 93; 464/181, 903; 244/100 R
See application file for complete search history.

(56) References Cited

U.S. PATENT DOCUMENTS 5,397,272 A * 3/1995 Smiley .................... F16C 3/026
138/109
2007/0152105 A1   7/2007 Filsinger et al.

FOREIGN PATENT DOCUMENTS

FR    2 953 160 A1   6/2011
FR    2 953 443 A1   6/2011
WO    2011/088992 A1   7/2011

OTHER PUBLICATIONS

International Search Report for PCT/EP2012/065370, dated Oct. 1, 2012.

*Primary Examiner* — Jeff Aftergut
*Assistant Examiner* — Jaeyun Lee
(74) *Attorney, Agent, or Firm* — Sughrue Mion, PLLC

(57) ABSTRACT

A method of fabricating an aircraft landing gear rocker beam comprising a body having a clevis (24) with two lugs (19, 21) parallel to a direction that is radial relative to the body, the method comprising the steps of: forming a first mandrel; applying one or more first braided fiber layers (11) on the first mandrel; fitting a second mandrel element on the assembly as constituted in this way, the second mandrel element extending between the two lugs (19, 21) of the clevis (24) that is to be formed; applying one or more second braided fiber layers (17) on the assembly as constituted in this way; injecting resin into the various layers (11, 17) and polymerizing the resin; and machining the resulting workpiece blank in order to cut away a region of the second braided layers (17) in order to separate the two lugs (19, 21) of the clevis (24) from each other.

6 Claims, 2 Drawing Sheets

(51) Int. Cl.
*B29C 70/54* (2006.01)
*B29C 70/86* (2006.01)
*B29C 70/22* (2006.01)
*B29C 70/24* (2006.01)
*B64C 25/60* (2006.01)
*F16C 7/02* (2006.01)
*B29K 105/08* (2006.01)
*B29C 70/48* (2006.01)

(52) U.S. Cl.
CPC ............... *B29C 70/865* (2013.01); *B64C 25/60* (2013.01); *F16C 7/026* (2013.01); *B29C 70/48* (2013.01); *B29C 2791/001* (2013.01); *B29K 2105/0827* (2013.01); *F16C 2326/43* (2013.01)

METHOD FOR MANUFACTURING A STRUCTURAL PART MADE OF A COMPOSITE MATERIAL AND INCLUDING A RADIALLY ORIENTED DOUBLE YOKE

CROSS REFERENCE TO RELATED APPLICATIONS

This application is a National Stage of International Application No. PCT/EP2012/065370, filed Aug. 6, 2012, claiming priority from French Patent Application No. 11 57251, filed Aug. 9, 2011, the contents of all of which are incorporated herein by reference in their entirety.

The invention relates to a method of using composite material to fabricate a structural part including two lugs that are radially oriented relative to a main direction of the portion of the body of the structural part that carries the resulting clevis.

BACKGROUND OF THE INVENTION

The invention relates to fabricating a part comprising a body in which at least a portion extends along a longitudinal main direction with a cross-section that defines a closed outline, and in which this portion is provided with two clevis lugs extending parallel to each other in a radial direction.

By way of example, such a part may correspond to an aircraft landing gear rocker beam, as shown in FIG. 1. It is known how to fabricate such a part out of metal alloy.

Such a known rocker beam made out of alloy is referenced 1 in FIG. 1. It comprises a main body 2 extending along a longitudinal axis AL, and at each end it has a respective clevis also extending along the longitudinal axis AL, these two clevises being referenced 3 and 4.

As can be seen in FIG. 1, the rocker beam also has a third clevis 6 that is carried by a portion of the main body 2 situated between its two ends 3 and 4. This intermediate clevis has two lugs that are referenced 7 and 8 and that extend parallel to each other in a direction DG that is radial relative to the longitudinal axis AL.

This intermediate clevis is for receiving a pin (not shown) that extends perpendicularly to the axes AL and DR while being spaced apart from the longitudinal axis AL. For this purpose, each lug 7, 8 includes a respective hole, with these two holes being in alignment with each other.

The object of the invention is to propose a method of fabricating such a structural part out of composite material made up of stiffening fibers and a matrix.

OBJECT OF THE INVENTION

The object of the invention is to propose a solution for remedying the above drawbacks.

SUMMARY OF THE INVENTION

To this end, the invention provides a method of fabricating a structural element such as an aircraft landing gear rocker beam out of composite material, the element comprising a body having a portion that extends along a longitudinal axis while presenting a cross-section that defines a closed outline while also being provided with a clevis comprising two lugs that extend parallel to a radial direction relative to the longitudinal axis, the clevis being for receiving a pin that is oriented perpendicularly to the longitudinal axis while being spaced apart from said longitudinal axis, the method comprising the steps of:

forming a first mandrel;
applying one or more first braided fiber layers on the first mandrel by using a braiding machine so that these layers extend all around the first mandrel and all along its length;
fitting a second mandrel element on the assembly formed by the first mandrel and each of the first layers that it is carrying, the second mandrel element extending in a region situated between the two lugs of the clevis that is to be formed;
applying one or more second braided fiber layers on the assembly constituted by the first mandrel with each of the first layers that it carries together with the second mandrel element fitted thereto;
injecting resin into the various fiber layers that have been applied, and polymerizing the resin in order to form a workpiece blank;
machining the workpiece blank in the vicinity of the clevis that is to be made so as to cut away a region of each second layer in order to separate the two lugs of the clevis from each other; and
making a hole in each lug of the clevis.

The invention thus makes it possible to make a part comprising a body having a closed section and carrying a clevis that is oriented radially relative to the main direction of the body.

The invention also provides a device as defined above, further comprising, prior to the step of injecting resin, a stitching and/or sewing operation for bonding together the first and second layers.

The invention also provides a device as defined above, wherein the stitching and/or sewing operation is performed so as to bond together the first and second layers in the vicinity of the lugs of the clevis.

The invention also provides a device as defined above, including applying a plurality of second layers, and wherein some of these second layers extended solely over a portion of the length of the assembly formed by the first mandrel carrying the first layers and by the second mandrel element.

DETAILED DESCRIPTION OF THE INVENTION

The idea on which the invention is based is to fabricate the structural part by braiding, with two series of braided fiber layers being applied, and subsequently with only the second family of braided layers being machined in the vicinity of the clevis, while the first family of braided layers is left intact. The structural part thus presents a closed cross-section in the vicinity of the clevis, thereby imparting high strength thereto, in particular in twisting.

Figure 1:
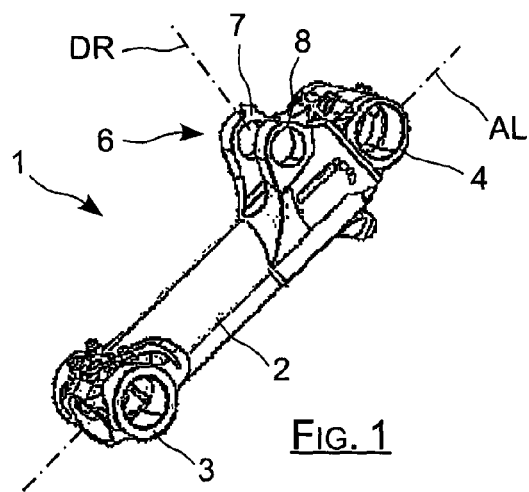
FIG. 1 is an overall view of a prior art rocker beam having a radial clevis.
Figure 2:
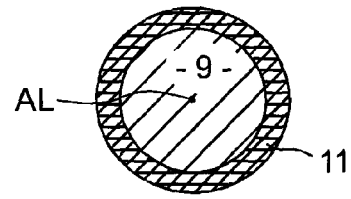
FIG. 2 is a cross-section view showing a step of applying first braided fiber layers on a first mandrel in accordance with the invention.

The invention thus consists in making a first mandrel, referenced 9 in FIG. 2, and in applying one or more first braided fiber layers on this first mandrel, this or these first layers being referenced 11.

Figure 3:
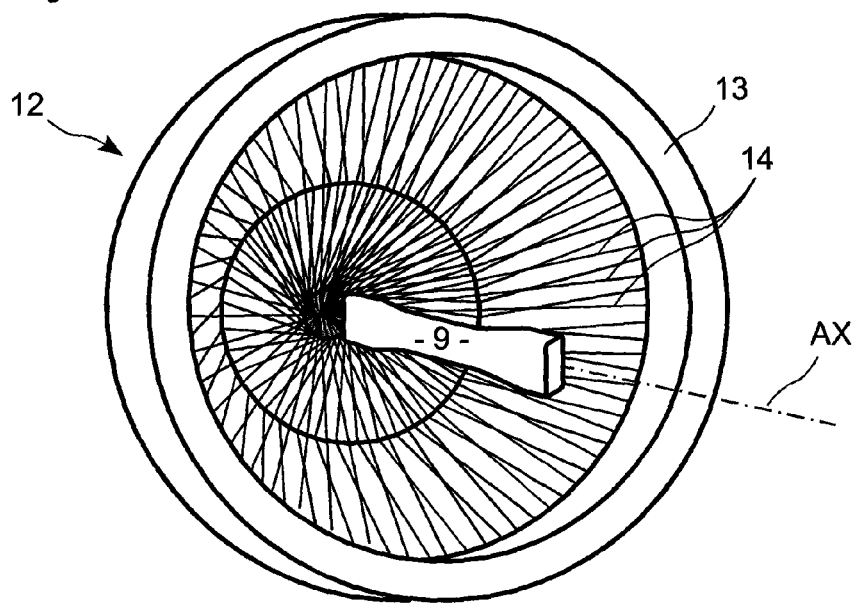
FIG. 3 is a diagrammatic overall view showing a braiding machine used in the method of the invention.

These first braided fiber layers are applied by using a braiding machine such as the machine 12 of FIG. 3. The braiding machine mainly comprises a circumferential ring 13 centered on an axis AX, the ring carrying on its rear face a series of reels of carbon fiber, these carbon fibers being referenced 14.

Specifically, the mandrel 9 is engaged in the braiding machine in such a manner that the longitudinal axis AL of the mandrel extends along the main axis AX of the machine, and the mandrel is moved along the axis AX through the ring 13. The assembly is driven by various servo-controlled drive means (not shown) such that a sock of carbon fibers becomes braided around the outside surface of revolution of the mandrel 9, while being pressed against that outside surface. One or more first layers of braided fibers are thus applied one on another during various passes over the entire length of the mandrel.

Figure 4:
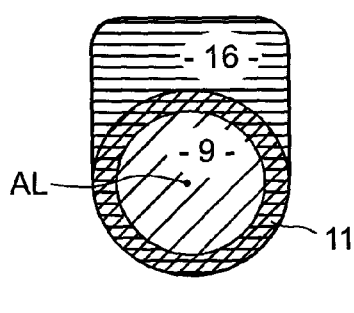
FIG. 4 is a cross-section view through the intermediate clevis showing a second mandrel element put into place in accordance with the invention.

Once these first braided fiber layers 11 have been applied, a second mandrel element 16 is fastened to the assembly formed by the first mandrel 9 and the first layers 11. As shown in FIG. 4, the second mandrel element 16 presents dimensions and size corresponding to the volume situated between the two radially-oriented lugs of the clevis that it is desired to make.

In other words, this second mandrel element 16 is significantly shorter than the first mandrel element 9, and it is also narrower and of smaller height. The first mandrel 9 and the second mandrel element 16 can themselves be made out of a composite material of the type comprising layers of preimpregnated fabric, or of some other type, in order to constitute components that are hollow. They may optionally be fabricated using foam so as to constitute mandrel components that, on the contrary, are of a "solid" type.

As shown in FIG. 4, the second mandrel element 16 is fitted onto the outside surface of the first braided layers 11 at the location of the radial clevis that is to be made, e.g. being fastened by adhesive.

After the second mandrel element 16 has been put into place, the assembly constituted by the first mandrel 9 together with the first braided layers 11 surrounding it and the second mandrel element 16 fitted thereon is once more installed in the braiding machine.

Figure 5:
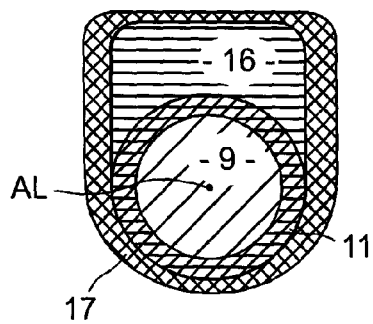
FIG. 5 is a cross-section view through the intermediate clevis and corresponding to applying second braided fiber layers in accordance with the invention.
Figure 6:
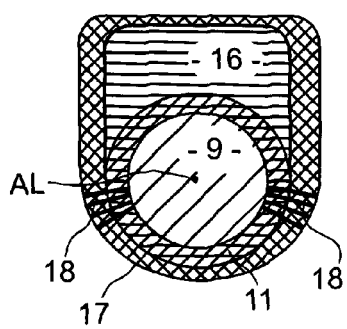
FIG. 6 is a cross-section view through the intermediate clevis showing an operation of stitching and/or sewing to bond together the first and second braided layers in accordance with the invention.

This assembly is then moved along the axis AX of the braiding machine in order to apply one or more second braided fiber layers that then surround the first braided fiber layers 9 and also the second mandrel element 16, as shown diagrammatically in FIG. 5.

These second layers may optionally be braided over only a portion of the part including the clevis. Nevertheless, under such circumstances, the last of the second braided layers advantageously extends over the entire length of the mandrel in order to cover all of the resulting part.

In general, the braiding machine may advantageously be set so as to deposit a greater quantity of fibers in the vicinity of the clevis, both for the first braided layers and for the second braided layers.

Once the second braided layers have been applied, an additional operation may be performed of stitching or sewing in order to bond together the first and second layers 11 and 16. This stitching or sewing operation naturally involves stitches that extend radially relative to the longitudinal axis AL, and given reference 18 in the figures, which stitches pass through the thicknesses of the first and second braided layers in order to bond them to one another.

Advantageously, these stitches are made in the zones that are the most stressed, e.g. such as in the vicinity of the bases of the lugs of the intermediate clevis, in order to increase the mechanical strength of the lugs concerning their cohesion with the remainder of the structural element.

Once the sewing or stitching operation, if any, has been terminated, resin is injected into all of the braided layers that have been deposited, and then the resin is polymerized, these operations being performed for example using an injection mold and/or an autoclave.

Once polymerization of the resin is complete, a workpiece blank is obtained prior to machining. The machining operation consists mainly in cutting away a region of the second braided layers in a portion of the wall formed by these second layers that is furthest from the axis AX.

More specifically, the workpiece blank is generally elongate in shape with a radial protuberance in the vicinity of the radial clevis that is to be made, this radial protuberance being in the form of a block containing the second mandrel element 16. Machining consists in cutting away the central region of the top portion of this block.

Figure 7:
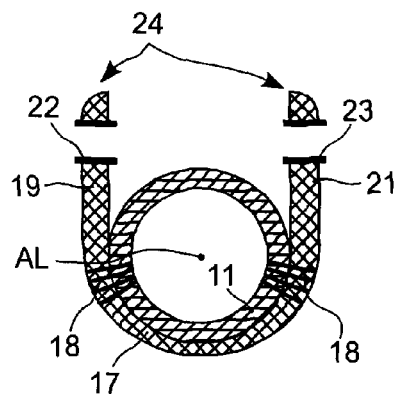
FIG. 7 is a cross-section view through the intermediate clevis showing the connecting rod after machining and after rings have been put into place in the lugs of the intermediate clevis.
Figure 8:
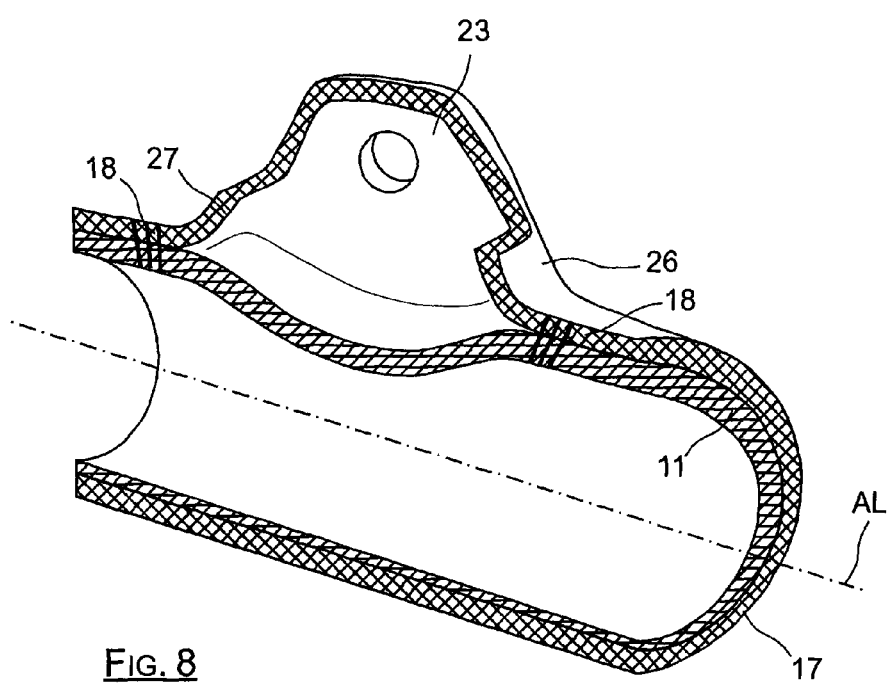
FIG. 8 is a longitudinal section view of a connecting rod fabricated in accordance with the invention and showing in particular the arrangements of the various braided fiber layers.

As shown in FIG. 7, the region cut away by machining serves to release the space corresponding to the second mandrel element 16 so as to constitute the two clevis lugs that are referenced 19 and 21 in FIGS. 7 and 8, both of these two lugs 19 and 21 being formed by the second braided fiber layers 16 so that together they form the clevis that is given reference 24 in FIG. 7.

Thereafter, a hole is made in the lug 19 and another hole is made in the lug 21 prior to installing respective metal rings in each of these holes, which rings are referenced 22 and 23.

As shown diagrammatically in FIG. 8, the region cut away by machining in the second layers 16 in order to separate the two lugs 19 and 21 from each other is cut away over a height that is less than the height of the lugs of the clevis. The region that is cut away by machining presents a depth that is as small as possible while ensuring that it is possible to pass the head of the part that is to be engaged between the lugs 19 and 21 of the radial clevis. As can be understood, this head of a part that is not shown is secured to the clevis by a pin (also now shown) passing through the two lugs 19 and 21 and the head of the part as engaged between the lugs.

In other words, the region is cut away over a height that is small enough for there to remain two wall portions 26 and 27 (visible in FIG. 8) in the vicinity of the bases of the lugs 19 and 21, which wall portions are formed by the second layers 16. These two wall portions extend transversely so as to interconnect the bases of the lugs 19 and 21 so as to reinforce their lateral mechanical strength.

As can be understood, the first mandrel 9 and the second mandrel element 16 may be removed after machining, as in the example in the figures. It is also possible, in the event that the mandrel and the mandrel element are of the hollow type and are made of composite material, for them to be left in place since their presence is not troublesome for the final part.

Figure 9:
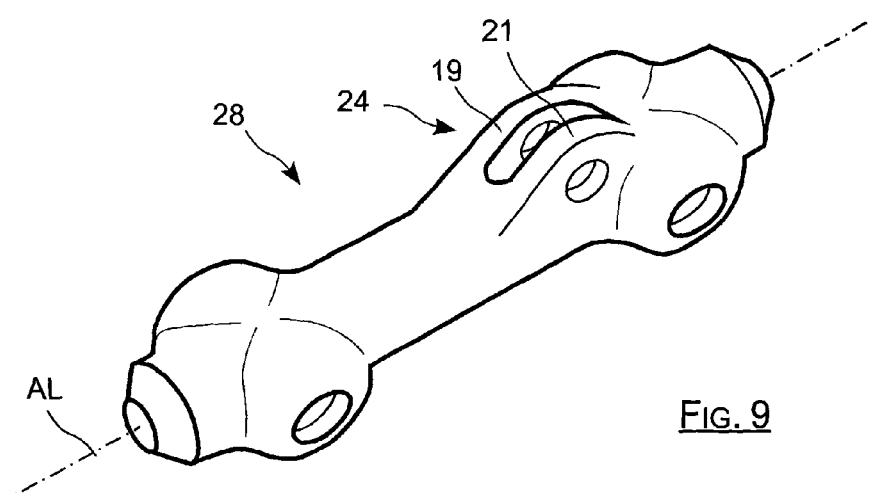
FIG. 9 is a diagrammatic view in perspective showing a connecting rod fabricated in accordance with the invention.

In general, the method of the invention makes it possible to make a part out of braided composite material comprising a main body with a portion in the form of a tubular arm, thus presenting a section of closed type, while also being provided with a clevis with two lugs oriented radially relative to the general direction of the arm. FIG. 9 shows an example of a structural part of this type, in the form of an aircraft landing gear rocker beam 28.

The invention claimed is:

1. A method of fabricating a structural element such as an aircraft landing gear rocker beam (28) out of composite material, the element comprising a body having a portion that extends along a longitudinal axis (AL) while presenting a cross-section that defines a closed outline while also being provided with a clevis (24) comprising two lugs (19, 21) that extend parallel to a radial direction relative to the longitudinal axis (AL), the clevis (24) being for receiving a pin that is oriented perpendicularly to the longitudinal axis (AL) while being spaced apart from said longitudinal axis (AL), the method comprising the steps of:
  forming a first mandrel (9);
  applying one or more first braided fiber layers (11) on the first mandrel (9) by using a braiding machine (12) so that these layers extend all around the first mandrel (9) and all along its length;
  fitting a second mandrel element (16) on the assembly (9, 11) formed by the first mandrel (9) and each of the first layers (11) that it is carrying, the second mandrel element (16) extending in a region situated between the two lugs (19, 21) of the clevis (24) that is to be formed;
  applying one or more second braided fiber layers (17) on the assembly constituted by the first mandrel (9) with each of the first layers (11) that it carries together with the second mandrel element (16) fitted thereto;
  injecting the resin into the various fiber layers (11, 17) that have been applied, and polymerizing the resin in order to form a workpiece blank;
  machining the workpiece blank in the vicinity of the clevis that is to be made so as to cut away a region of each second layer (17) in order to separate the two lugs (19, 21) of the clevis (24) from each other; and
  making a hole in each lug (19, 21) of the clevis (24).

2. A method according to claim 1, further comprising, prior to the step of injecting resin, a stitching and/or sewing operation for bonding together the first and second layers (11, 17).

3. A method according to claim 2, wherein the stitching and/or sewing operation is performed so as to bond together the first and second layers (11, 17) in the vicinity of the lugs (19, 21) of the clevis (24).

4. A method according to claim 1, including applying a plurality of second layers (17), and wherein some of these second layers (17) extended solely over a portion of the length of the assembly formed by the first mandrel (9) carrying the first layers (11) and by the second mandrel element (16).

5. A method according to claim 2, including applying a plurality of second layers (17), and wherein some of these second layers (17) extended solely over a portion of the length of the assembly formed by the first mandrel (9) carrying the first layers (11) and by the second mandrel element (16).

6. A method according to claim 3, including applying a plurality of second layers (17), and wherein some of these second layers (17) extended solely over a portion of the length of the assembly formed by the first mandrel (9) carrying the first layers (11) and by the second mandrel element (16).

* * * * *